United States Patent Office 3,553,117
Patented Jan. 5, 1971

3,553,117
TERNARY SYSTEM FOR POLYACETAL STABILIZATION
Klemens Gutweiler, Frankfurt am Main, Germany, assignor to Farbwerke Hoechst Aktiengesellschaft vormals Meister Lucius & Bruning, Frankfurt am Main, Germany, a corporation of Germany
No Drawing. Filed Mar. 21, 1968, Ser. No. 714,810
Claims priority, application Germany, Apr. 8, 1967, F 52,069
Int. Cl. C08g *51/56*
U.S. Cl. 260—18        11 Claims

ABSTRACT OF THE DISCLOSURE

Polyacetals are stabilized using a stabilizer system consisting of an antioxidant, an alkaline earth metal salt and a tertiary amine.

---

The present invention provides stabilized polyacetals on the basis of formaldehyde, using a ternary stabilizer system consisting of an antioxidant, an alkaline earth metal salt and a tertiary amine, and a process for preparing them.

As polyacetals there are generally to be understood polymers, the chain of which predominantly consists of $OCH_2$— groups. They may be obtained by a homopolymerization of formaldehyde or trioxane or by copolymerization of trioxane with cyclic ethers, for example ethylene oxide, or cyclic formals, for example 1,3-dioxolane or 1,4-butane-diol formal.

It is known that homo- and copolymers of formaldehyde have unstable semi-acetal terminal groups which, while formaldehyde is split off, begin with a degradation that affects the chain of the homopolymers completely and that of the copolymers down to the nearest co-monomer unit. In industry, these unstable semi-acetal terminal groups are stabilized in the homopolymers by acetylation or alkylation of the terminal groups; in copolymers, they are degraded by alkalies down to the first comonomer unit, whereby also polyacetals having alkylated terminal groups are obtained.

However, even polyacetals having stabilized terminal groups have not yet been suitable for preparing plastic materials since they undergo a degradation at the processing temperature.

It is known that the thermal degradation can be suppressed by stabilizers, especially by the combination of an antioxidant with a compound containing nitrogen. As antioxidants there have been used various compounds containing sulfur. These compounds, however, cause the polymer to change its tint considerably, moreover, they do not provide a maximum thermostability.

As nitrogen-containing compounds having stabilizing properties there are known hydantoins, hydrazines, aromatic amines, urethanes, urea and its derivatives, sulfonamides, polyamides, mixtures of different polyamides, melamine and dicyano-diamide. Some of these compounds only have a weak stabilizing action, others—although they have a satisfactory stabilizing action—cause the polyacetal to change its tint or, as is, for example, the case with dicyano-diamide, although they hardly cause a change in tint and have a fair stabilizing action, they involve the disadvantage of easily exuding from the polyacetals.

It is known that all stabilizers containing nitrogen, even polyamides, exude more or less easily from the polyacetals, especially at the processing temperature, and deposit on the molds of the processing machines, thus gravely disturbing the continuous production. These deposits gradually form a nitrogen-containing layer on the molds, which causes surface marks and a change in the tint of the molded articles. This layer that can only be removed by mechanical means, is a condensate which is formed by the reaction of formaldehyde with the free hydrogen atom at the nitrogen atom of the stabilizer molecule. It is, therefore, of a great technical importance to find a stabilizer system which does not form a layer on the molds.

We have now found that polyacetals can be stabilized with a ternary stabilizer system which has an excellent stabilizing action and does not form a layer on the molds and which comprises a mixture of from 0.1 to 5.0% by weight of an oxidation stabilizer, from 0.01 to 5.0% by weight of an alkaline earth metal salt, preferably a calcium salt, and from 5 to 1,000 p.p.m. of a tertiary amine having low molecular weight aliphatic alkyl radicals, as a synergist, the amounts being calculated on the polyacetal.

A preferred embodiment of the invention consists in using calcium oxide or calcium hydroxide instead of an organic calcium salt. When voltaile tertiary amines are used, it is advantageous to use them in the form of their salts of hydrofluoric acid.

The amounts of oxidation stabilizer used are preferably in the range of from 0.5 to 1.0% by weight, the amounts of the alkaline earth metal salt in the range of from 0.1 to 0.5% by weight and the amounts of the tertiary amine in the range of from 10 to 100 p.p.m.

The oxidation stabilizer and the alkaline earth metal salt as such have no, or only a slight, stabilizing action. Only when the synergist which, separately, has neither a stabilizing action, is added thereto, the system displays its full stabilizing activity.

As oxidation stabilizers there may be used phenols, especially monophenols, bis-phenols or poly-phenols, substituted by alkyl groups containing from 2 to 10 carbon atoms. Among the aforesaid compounds there are suitable, for example, 2.6-di-tert.-butyl-4-methyl-phenol, isobornyl-o-cresol (partially dehydrated), 2.2'-methylene-bis[4-methyl-6-($\alpha$-methyl-cyclohexyl) - phenol], 4.4'-butylidene-bis(6-tert.-butyl-3-methyl - phenol), 4.4'-methylene-bis(2.6-di-tert-butyl-phenol); 2.2' - methylene - bis(4-methyl-6-tert.-butyl-phenol) being preferred. Furthermore suitable are poly-phenols known under the trade name "Irganox" in particular Irganox® 1010, i.e., beta (3,5-di-tertiarybutyl-4-hydroxyphenyl)propionic acid ester of pentaerythritol, as well as novolaks and mixed novolaks.

As alkaline earth metal salts there are used the alkaline earth metal salts of carboxylic acids, especially calcium salts of saturated aliphatic carboxylic acids, such as acetic acid, adipic acid, sebacic acid and stearic acid; calcium salts of unsaturated aliphatic carboxylic acids, such as acrylic acid, undecylenic acid, crotonic acid, cinnamic acid, ricinoleic acid and oleic acid; and calcium salts of aromatic carboxylic acids, such as benzoic acid and p-hydroxybenzoic acid. Instead of an organic calcium salt, there may also preferably be used calcium oxide or calcium hydroxide.

The synergists used according to the invention are tertiary amines substituted by low molecular weight aliphatic alkyl radicals containing from 1 to 6, preferably from 2 to 4 carbon atoms. Tributylamine and triethylene diamine are preferred. Readily volatile tertiary amines, for example triethylamine, are preferably used in the form of the salts of hydrofluoric acid.

The stabilizer system used according to the invention can be mixed by usual methods with the polyacetals, even in combination with pigment dyestuffs. It is, however, advantageous to introduce the synergist dissolved in a solvent, for example ether or methanol, into the polyacetal with a view to an easier dosage, when minor samples are stabilized, and then to remove the solvent at a reduced pressure.

For testing the stabilizer, 5 grams of a powder of a hydrolyzed copolymer made of 98% by weight of trioxane and 2% by weight of ethylene oxide were stabilized and maintained under air for 45 minutes at 230° C.±1° C. Subsequently, the percentage of the loss in weight per minute was determined ($K_D$—value).

The values obtained are compiled in the following table. (2,2'-methylene-bis(4-methyl-6-tert.-butyl-phenol) is abbreviated to read MBP, the indicated content is calculated on the polymer.)

TABLE

| Serial No. | Antioxidant | Percent | Alkaline earth metal Salt | Percent | Tertiary amine | P.p.m. | $K_D$—values |
|---|---|---|---|---|---|---|---|
| 1 | MBP | 0.5 | | | | | 0.23; 0.24 |
| 2 | MBP | 0.5 | Calcium salt of stearic acid | 0.1 | | | 0.084; 0.093 |
| 3 | MBP | 0.5 | Calcium hydroxide | 0.1 | | | 0.177; 0.147 |
| 4 | MBP | 0.5 | | | Tributylamine | 50 | 0.38; 0.33 |
| 5 | Irganox ® | 0.7 | Calcium hydroxide | 0.1 | | | 0.103; 0.095 |
| 6 | MBP | 0.5 | Barium salt of cinnamic acid | 0.1 | Tributylamine | 50 | 0.008; 0.009 |
| 7 | MBP | 0.5 | Strontium salt of cinnamic acid | 0.1 | do | 50 | 0.010; 0.008 |
| 8 | MBP | 0.5 | Calcium salt of cinnamic acid | 0.1 | do | 50 | 0.007; 0.009 |
| 9 | MBP | 0.5 | Calcium salt of adipic acid | 0.1 | do | 50 | 0.011; 0.014 |
| 10 | MBP | 0.5 | Calcium salt of stearic acid | 0.1 | do | 50 | 0.020; 0.019 |
| 11 | MBP | 0.5 | Calcium salt of acrylic acid | 0.1 | do | 50 | 0.014; 0.016 |
| 12 | MBP | 0.5 | Calcium salt of undecylenic acid | 0.1 | do | 50 | 0.013; 0.014 |
| 13 | MBP | 0.5 | Calcium salt of benzoic acid | 0.1 | do | 50 | 0.013; 0.010 |
| 14 | MBP | 0.5 | Calcium hydroxide | 0.1 | do | 50 | 0.014; 0.015 |
| 15 | MBP | 0.5 | do | 0.1 | Triethylene diamine | 20 | 0.011; 0.010 |
| 16 | MBP | 0.5 | do | 0.1 | Triethylamine·$H_2F_2$ | 50 | 0.010; 0.011 |
| 17 | Irganox ® | 0.7 | do | 0.1 | Triethylene diamine | 20 | 0.020; 0.021 |

The table shows that the process of the invention using the ternary system of antioxidant, alkaline earth metal salt and tertiary amine, is distinguished by a strong stabilizing activity. This activity could all the less be expected as the individual components of the system exhibit an only unsatisfactory or no stabilizing action at all. The process of the invention can, therefore, be especially well applied for stabilizing plastic materials, in particular those plastic materials which are subject to a thermal degradation due to formaldehyde being split off.

What is claimed is:
1. A polyacetal stabilized against thermal degradation, said polyacetal having incorporated therein as a stabilizer a stabilizing amount of a mixture of (a) phenolic oxidation stabilizer, (b) alkaline earth metal oxide, hydroxide or hydrocarbyl carboxylate and (c) a compound selected from the group consisting of a tertiary amine substituted by alkyl radicals of 1 to 6 carbon atoms and the hydrofluoride salt of a volatile tertiary amine thereof.

2. A stabilized polyacetal according to claim 1 wherein the alkaline earth metal compound is calcium oxide or hydroxide.

3. A stabilized polyacetal according to claim 1 wherein the alkaline earth metal compound is calcium hydrocarbyl carboxylate.

4. A stabilized polyacetal according to claim 1 wherein the tertiary amine is tributylamine.

5. A stabilized polyacetal according to claim 1 wherein the tertiary amine is triethylene diamine.

6. A stabilized polyacetal according to claim 1 wherein compound (c) is a hydrofluoride salt of a volatile tertiary amine substituted by alkyl radicals of 1 to 6 carbon atoms.

7. A polyacetal stabilized against thermal degradation, said polyacetal having incorporated therein as a stabilizer a mixture of (a) 0.1 to 5.0% by weight of phenolic oxidation stabilizer selected from monophenols, bis-phenols and polyphenols which may be substituted by alkyl groups containing from 2 to 10 carbon atoms, (b) 0.01 to 5.0% by weight of alkaline earth metal oxide, hydroxide or hydrocarbyl carboxylate and (c) 5 to 1000 parts per million parts of polyacetal polymer of a tertiary amine substituted by alkyl radicals of 1 to 6 carbon atoms.

8. A stabilized polyacetal according to claim 7 wherein the alkaline earth metal compound is calcium oxide or hydroxide.

9. A stabilized polyacetal according to claim 7 wherein the alkaline earth metal compound is calcium hydrocarbyl carboxylate.

10. A stabilized polyacetal according to claim 7 wherein the tertiary amine is tributylamine.

11. A stabilized polyacetal according to claim 7 wherein the tertiary amine is triethylene diamine.

References Cited

UNITED STATES PATENTS

| 3,152,101 | 10/1964 | Dolce | 260—45.9 |
| 3,225,005 | 12/1965 | Asmus | 260—45.9 |
| 3,337,504 | 8/1967 | Fisher | 260—67 |
| 3,340,219 | 9/1967 | Stemmler | 260—18 |

HOSEA E. TAYLOR, Primary Examiner

V. P. HOKE, Assistant Examiner

U.S. Cl. X.R.

260—45.7, 45.85, 45.9, 45.95, 67